(12) United States Patent
Kirkup et al.

(10) Patent No.: US 8,583,056 B2
(45) Date of Patent: *Nov. 12, 2013

(54) WIRELESS/WIRED MOBILE COMMUNICATION DEVICE WITH OPTION TO AUTOMATICALLY BLOCK WIRELESS COMMUNICATION WHEN CONNECTED FOR WIRED COMMUNICATION

(75) Inventors: Michael G. Kirkup, Waterloo (CA); Michael K. Brown, Fergus (CA); Herbert A. Little, Waterloo (CA); Ian Robertson, Waterloo (CA); Michael S. Brown, Kitchener (CA)

(73) Assignee: Blackberry Limited, Waterloo (CA)

( * ) Notice: Subject to any disclaimer, the term of this patent is extended or adjusted under 35 U.S.C. 154(b) by 81 days.

This patent is subject to a terminal disclaimer.

(21) Appl. No.: 13/348,920

(22) Filed: Jan. 12, 2012

(65) Prior Publication Data
US 2012/0117616 A1  May 10, 2012

Related U.S. Application Data

(63) Continuation of application No. 10/976,303, filed on Oct. 29, 2004, now Pat. No. 8,099,060.

(51) Int. Cl.
*H04B 1/40* (2006.01)
(52) U.S. Cl.
USPC ............... 455/74.1; 455/552.1; 455/554.2; 455/566; 455/575.1; 455/41.2; 370/252; 370/254; 370/245
(58) Field of Classification Search
None
See application file for complete search history.

(56) References Cited

U.S. PATENT DOCUMENTS

| | | | |
|---|---|---|---|
| 4,815,128 A | 3/1989 | Malek | |
| 4,837,812 A | 6/1989 | Takahashi et al. | |
| 4,972,457 A | 11/1990 | O'Sullivan | |
| 4,991,197 A | 2/1991 | Morris | |
| 5,408,520 A | 4/1995 | Clark et al. | |
| 5,606,594 A | 2/1997 | Register et al. | |
| 5,802,483 A | 9/1998 | Morris | |
| 5,850,515 A | 12/1998 | Lo et al. | |
| 5,987,611 A | 11/1999 | Freund | |
| 6,131,136 A | 10/2000 | Liebenow et al. | |
| 6,243,756 B1 | 6/2001 | Whitmore et al. | |
| 6,253,326 B1 | 6/2001 | Lincke et al. | |
| 6,285,889 B1 | 9/2001 | Nykanen et al. | |

(Continued)

FOREIGN PATENT DOCUMENTS

| | | |
|---|---|---|
| CA | 2505343 C | 6/2010 |
| CN | 1540881 | 10/2004 |

(Continued)

OTHER PUBLICATIONS

Business Wire, "Cirond Offers Wireless Security Solution to Meet Needs of More than 27 Million Wirless Notebooks," Jul. 29, 2004, Internet Sales.*

*Primary Examiner* — Charles Appiah
*Assistant Examiner* — Randy Peaches
(74) *Attorney, Agent, or Firm* — Ridout and Maybee LLP

(57) ABSTRACT

A mobile wireless communication device also has at least one wired communication port. Enhanced security is achieved by permitting the device to automatically disable one or more wireless ports when connected to a wired port. Specific combinations/permutations of such automatic control may be effected by use of an IT Policy also resident on the device.

23 Claims, 4 Drawing Sheets

(56) References Cited

U.S. PATENT DOCUMENTS

| | | | |
|---|---|---|---|
| 6,343,313 B1 | 1/2002 | Salesky | |
| 6,490,289 B1 | 12/2002 | Zhang et al. | |
| 6,745,047 B1 | 6/2004 | Karstens et al. | |
| 6,748,543 B1 | 6/2004 | Vilhuber | |
| 6,775,536 B1 | 8/2004 | Geiger et al. | |
| 6,895,502 B1 | 5/2005 | Fraser | |
| 6,901,429 B2 | 5/2005 | Dowling | |
| 7,042,988 B2 | 5/2006 | Juitt et al. | |
| 7,076,239 B2 | 7/2006 | Kirkup et al. | |
| 7,076,797 B2 | 7/2006 | Loveland | |
| 7,146,638 B2 | 12/2006 | Malcolm | |
| 7,187,678 B2 | 3/2007 | Cunetto et al. | |
| 7,209,813 B2 * | 4/2007 | Namaky | 701/33.2 |
| 7,330,712 B2 | 2/2008 | Kirkup et al. | |
| 2002/0184398 A1 | 12/2002 | Orenshteyn | |
| 2003/0014521 A1 | 1/2003 | Elson et al. | |
| 2003/0031184 A1 | 2/2003 | Cunetto et al. | |
| 2003/0054860 A1 | 3/2003 | Chen | |
| 2003/0070091 A1 | 4/2003 | Loveland | |
| 2003/0087629 A1 | 5/2003 | Juitt et al. | |
| 2003/0142631 A1 * | 7/2003 | Silvester | 370/252 |
| 2003/0167405 A1 | 9/2003 | Freund et al. | |
| 2004/0097217 A1 | 5/2004 | McClain | |
| 2004/0121802 A1 | 6/2004 | Kim et al. | |
| 2004/0224642 A1 | 11/2004 | Kim et al. | |
| 2008/0012839 A1 | 1/2008 | Feague et al. | |

FOREIGN PATENT DOCUMENTS

| | | |
|---|---|---|
| EP | 1168141 A2 | 1/2002 |
| EP | 1471691 A2 * | 10/2004 |
| EP | 1563663 B1 | 10/2008 |
| GB | 2378780 A | 2/2003 |
| WO | 0060434 | 10/2000 |
| WO | 2004/043031 A1 | 5/2004 |

\* cited by examiner

WIRELESS/WIRED MOBILE COMMUNICATION DEVICE WITH OPTION TO AUTOMATICALLY BLOCK WIRELESS COMMUNICATION WHEN CONNECTED FOR WIRED COMMUNICATION

CROSS-REFERENCE TO RELATED APPLICATIONS

The present application is a continuation application of U.S. patent application Ser. No. 10/976,303, filed Oct. 29, 2004, the contents of which are hereby incorporated herein by reference.

BACKGROUND OF THE INVENTION

1. Technical Field

This invention relates to apparatus, method and stored computer program media effecting improved communications network security for wired and wireless communications networks interfacing with a device capable of communicating with either type of network.

2. Description of Related Art

Many modern wireless mobile communication devices also include a wired connection port that may be utilized for connections to wired networks. There may also be a plurality of wireless communication ports made available (e.g., traditional RF, Bluetooth, infra-red (e.g., irda) and the like). If such wired and wireless communication ports are simultaneously connected to different networks, then it is possible for that device to constitute a security threat (e.g., as a potential gateway between networks having different security levels). For example, a wired network may typically be thought to have a higher level of security associated with it than does a wireless network.

Disparities in perceived security between different wired networks and/or sub-networks is also possible. For example, a feature known as "split tunneling" was created possibly to allow unhindered web surfing and corporate virtual private network (VPN) access simultaneously from remote personal computers. This permits a reduced load on the VPN gateway but it can also allow an application running on a client to maliciously forward packets from the Internet to the more security conscious enterprise network.

In the case of "split tunneling" it has been recognized that some of the potential danger can be minimized by turning off the split tunneling feature whenever the client is connected to the VPN. However, the potential security risk caused by simultaneous wireless and wired connection of a mobile communication device to networks having different security levels continues to present potential security issues.

A related problem is addressed in an earlier commonly assigned application 60/424,723 filed Nov. 8, 2002 entitled "SYSTEM AND METHOD OF CONNECTION CONTROL FOR WIRELESS MOBILE COMMUNICATION DEVICES, now non-provisional application Ser. No. 10/698, 602 filed Oct. 31, 2003 naming Michael G. Kirkup, Herbert A. Little, David Yach as inventors.

BRIEF SUMMARY OF THE INVENTION

A wired/wireless mobile communication device is provided with an enhanced security feature that permits automatic blocking of wireless communication when it is connected for wired communication. Such enhanced security may, if desired, be effected subject to an IT Policy residing in the device (e.g., as downloaded by an IT administrator).

A mobile wireless communication device having a plurality of communication ports may have a computer driven control circuit connected to control communication via each of those plural ports. An enhanced security sub-routine can be incorporated into that control circuit and adapted to automatically control (i.e., turn "off") at least one wireless communication port whenever a wired port is connected for use.

In the exemplary embodiments, the wired port can be a USB port and the wireless port can be a traditional RF transceiver circuit. However, the wireless port may also be a Bluetooth communication circuit, an infra-red or other optical communication circuit or any other wireless port. Similarly, the wired port may be a serial or parallel or any other wired digital data communication port.

In the exemplary embodiments, the security sub-routine effects automatic control in conformance with an IT Policy that also resides within the control circuit. This gives an IT administrator to power to set an IT Policy that might, for example, either enable the enhanced security feature or disable it.

Although control of the physical ports may be achieved in various ways, the exemplary embodiment achieves control over the RF wireless transceiver by calling an API for the RF transceiver and temporarily disabling it from use (i.e., effectively turning the transceiver "off") if a connection is sensed as being present at a wired USB port.

This invention may be embedded in hardware, software or a combination of hardware and software. The invention provides a method for achieving enhanced security in a wireless/wired mobile communication device by automatically blocking wireless communication when connected for wired communication.

BRIEF DESCRIPTION OF THE DRAWINGS

These and other objects and advantages of this invention will be more completely understood and appreciated by careful study of the following more detailed description of at least one exemplary embodiment in conjunction with the accompanying drawings, in which.

DETAILED DESCRIPTION OF EXEMPLARY EMBODIMENTS

Figure 1:
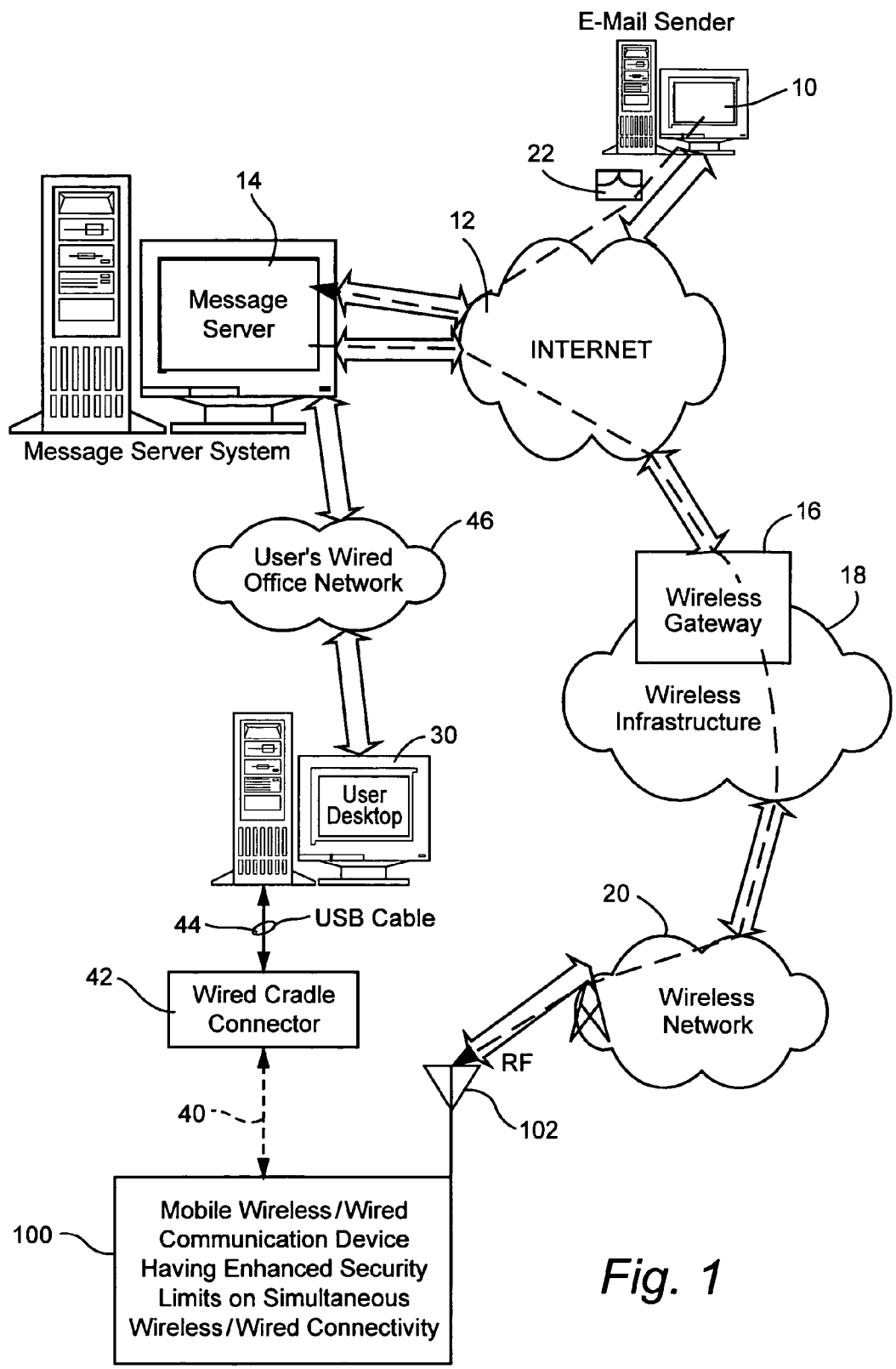
FIG. 1 is an overall system wide schematic view of an exemplary wireless e-mail communication system incorporating a mobile wireless/wired communication device having an enhanced security sub-routine to enforce a resident IT Policy blocking simultaneous communication over another port when connected to a wired communication port in accordance with one exemplary embodiment of this invention.

FIG. 1 is an overview of an exemplary communication system in which a wireless communication device 100 (with an optional wired connection port 40) may be used in accordance with this invention. One skilled in the art will appreciate that there may be hundreds of different system topologies. There may also be many message senders and recipients. The simple exemplary system shown in FIG. 1 is for illustrative purposes only, and shows perhaps the currently most prevalent Internet e-mail environment.

FIG. 1 shows an e-mail sender 10, the Internet 12, a message server system 14, a wireless gateway 16, wireless infrastructure 18, a wireless network 20 and a mobile communication device 100.

An e-mail sender 10 may, for example, be connected to an ISP (Internet Service Provider) on which a user of the system has an account, located within a company, possibly connected to a local area network (LAN), and connected to the Internet 12, or connected to the Internet 12 through a large ASP (application service provider) such as American Online™ (AOL). Those skilled in the art will appreciate that the systems shown in FIG. 1 may instead be connected to a wide area network (WAN) other than the Internet, although e-mail transfers are commonly accomplished through Internet-connected arrangements as shown in FIG. 1.

The message server 14 may be implemented, for example, on a network computer within the firewall of a corporation, a computer within an ISP or ASP system or the like, and acts as the main interface for e-mail exchange over the Internet 12. Although other messaging systems might not require a message server system 14, a mobile device 100 configured for receiving and possibly sending e-mail will normally be associated with an account on a message server. Perhaps the two most common message servers are Microsoft Exchange™ and Lotus Domino™. These products are often used in conjunction with Internet mail routers that route and deliver mail. These intermediate components are not shown in FIG. 1, as they do not directly play a role in the invention described below. Message servers such as server 14 typically extend beyond just e-mail sending and receiving; they also include dynamic database storage engines that have predefined database formats for data like calendars, to-do lists, task lists, e-mail and documentation.

The wireless gateway 16 and infrastructure 18 provide a link between the Internet 12 and wireless network 20. The wireless infrastructure 18 determines the most likely network for locating a given user and tracks the users as they roam between countries or networks. A message is then delivered to the mobile device 100 via wireless transmission, typically at a radio frequency (RF), from a base station in the wireless network 20 to the mobile device 100. The particular network 20 may be virtually any wireless network over which messages may be exchanged with a mobile communication device.

As shown in FIG. 1, a composed e-mail message 22 is sent by the e-mail sender 10, located somewhere on the Internet 12. This message 22 typically uses traditional Simple Mail Transfer Protocol (SMTP), RFC 822 headers and multipurpose Internet Mail Extension (MIME) body parts to define the format of the mail message. These techniques are all well known to those skilled in the art. The message 22 arrives at the message server 14 and is normally stored in a message store. Most known messaging systems support a so-called "pull" message access scheme, wherein the mobile device 100 must request that stored messages be forwarded by the message server to the mobile device 100. Some systems provide for automatic routing of such messages which are addressed using a specific e-mail address associated with the mobile device 100. In a preferred embodiment, messages addressed to a message server account associated with a host system such as a home computer or office computer 30 which belongs to the user of a mobile device 100 are redirected from the message server 14 to the mobile device 100 as they are received.

Regardless of the specific mechanism controlling forwarding of messages to mobile device 100, the message 22, or possibly a translated or reformatted version thereof, is sent to wireless gateway 16. The wireless infrastructure 18 includes a series of connections to wireless network 20. These connections could be Integrated Services Digital Network (ISDN), Frame Relay or T1 connections using the TCP/IP protocol used throughout the Internet. As used herein, the term "wireless network" is intended to include three different types of networks, those being (1) data-centric wireless networks, (2) voice-centric wireless networks and (3) dual-mode networks that can support both voice and data communications over the same physical base stations. Combined dual-mode networks include, but are not limited to, (1) Code Division Multiple Access (CDMA) networks, (2) the Group Special Mobile or the Global System for Mobile Communications (GSM) and the General Packet Radio Service (GPRS) networks, and (3) future third-generation (3G) networks like Enhanced Datarates for Global Evolution (EDGE) and Universal Mobile Telecommunications Systems (UMTS). Some older examples of data-centric network include the Mobitex™ Radio Network and the DataTAC™ Radio Network. Examples of older voice-centric data networks include Personal Communication Systems (PCS) networks like GSM, and TDMA systems.

The wireless RF communication port connection is made via antenna 102 as depicted in FIG. 1. However, the mobile wireless/wired communication device 100 also has a wired connection port 40 which mates with a connection in a wired cradle 42 to establish a wired digital communication link via a USB cable 44 to USB port of the user desktop computer 30. As will be appreciated, the user's computer 30 is also connected to the user's wired office network 46 (as is the message server 14).

Figure 2:
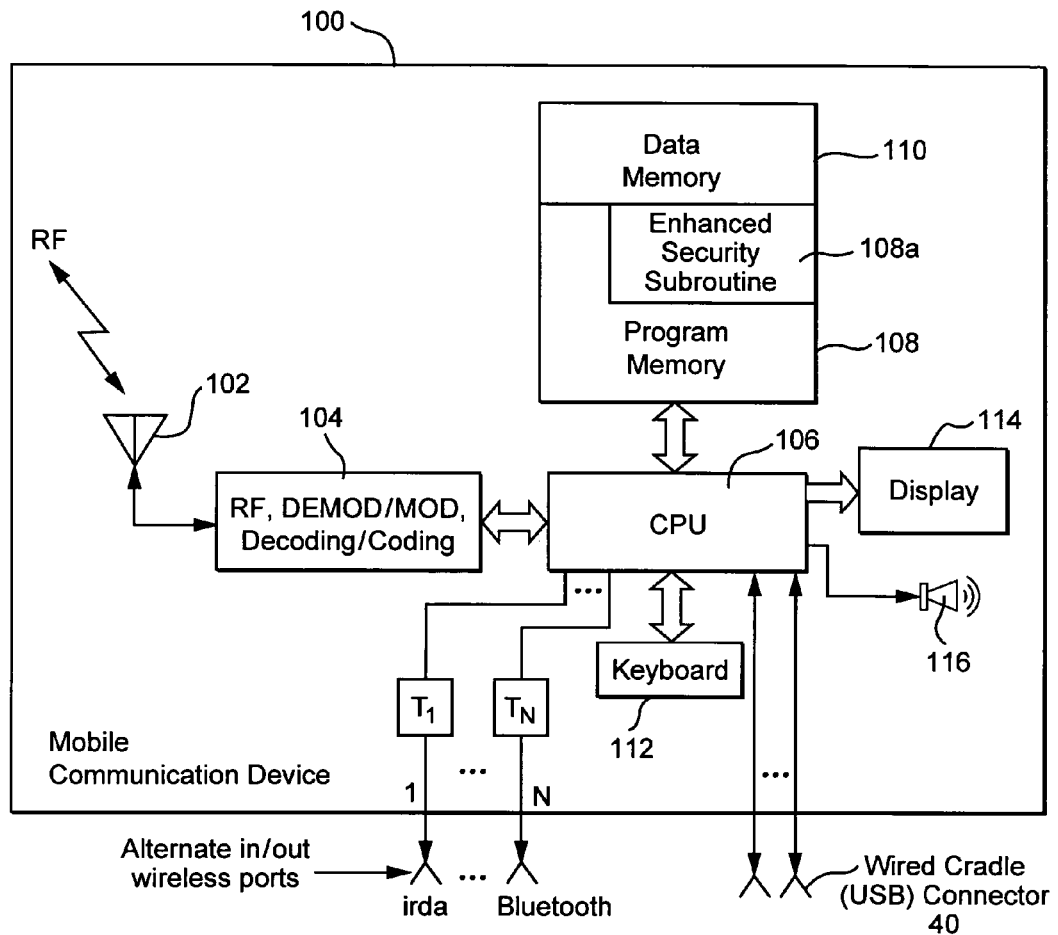
FIG. 2 is an abbreviated schematic diagram of hardware included within an exemplary mobile wireless/wired communication device of FIG. 1.

As depicted in FIG. 2, mobile communication device 100 includes a suitable RF antenna 102 for wireless communication to/from wireless network 20. Conventional RF, demodulation/modulation and decoding/coding circuits 104 are provided. As those in the art will appreciate, such circuits can involve possibly many digital signal processors (DSPs), microprocessors, filters, analog and digital circuits and the like. However, since such circuitry is well known in the art, it is not further described.

The mobile communication device 100 will also typically include a main control CPU 106 which operates under control of a stored program in program memory 108 (and which has access to data memory 110). CPU 106 also communicates with a conventional keyboard 112, display 114 (e.g., an LCD) and audio transducer or speaker 116. A portion of program memory 108a is available for storing an enhanced security sub-routine (which may also interface with and use an IT Policy resident in data memory 110. Suitable computer program executable code is stored in portions of program memory 108a to constitute the enhanced security sub-routine logic described below.

As also depicted in FIG. 2, the CPU 106 is connected to a wired cradle USB connector 40 (which is, in effect, a USB port) and/or to any one or all of additional alternate input/output wireless ports (e.g., Irda, Blue tooth, etc.). As will be appreciated, such wireless ports will be associated with suitable transducer $T_1$ through $T_N$.

Figure 3:
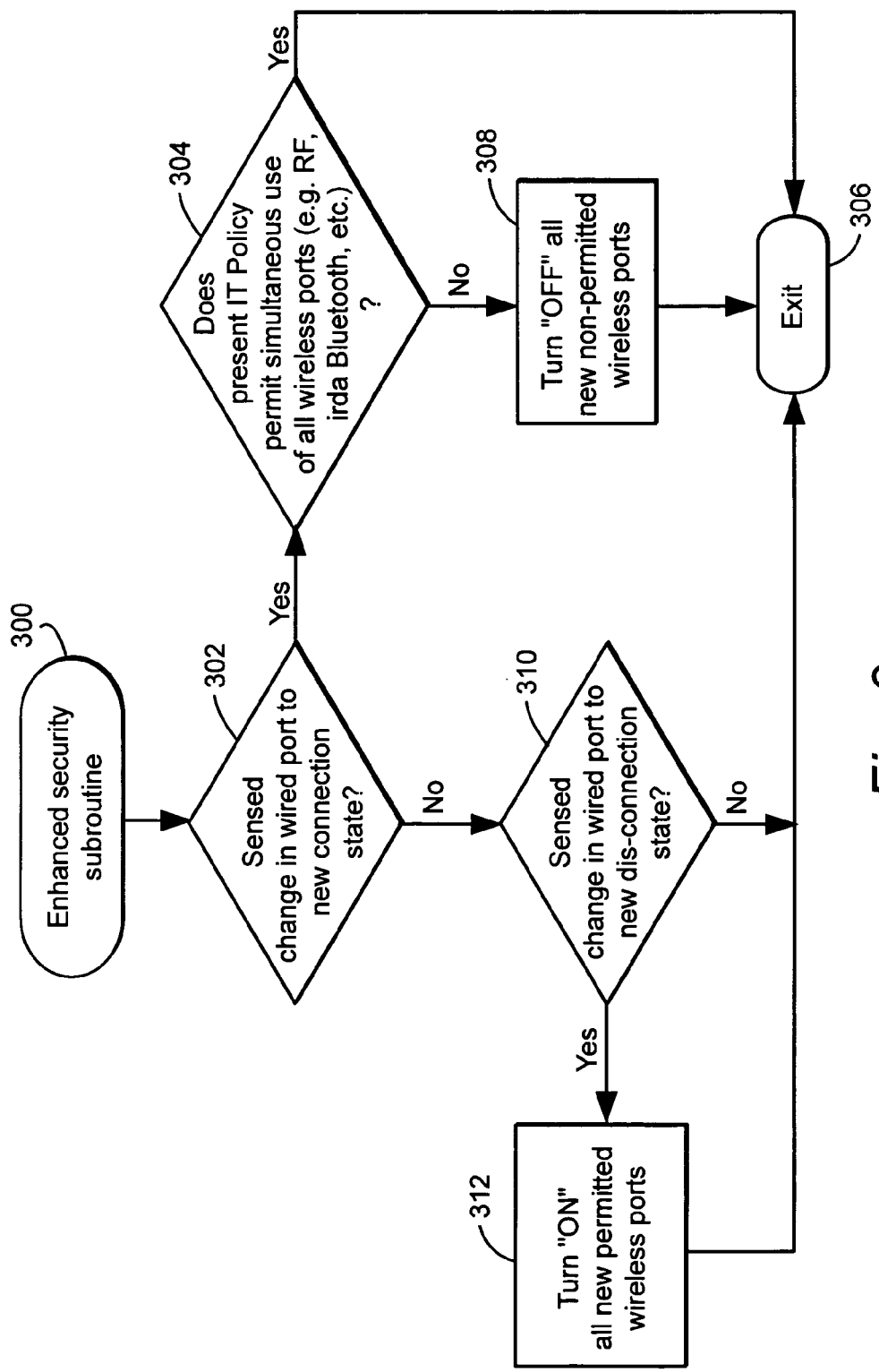
FIG. 3 is an exemplary abbreviated schematic flow chart of computer software (i.e., program logic) that may be used in the device of FIG. 2 for an enhanced sub-routine.

An enhanced security sub-routine is entered at 300 as depicted in FIG. 3 any time there is a sensed change in conductivity to a wired port. If the sensed change indicates a new connection state as determined at 302, then the current IT Policy resident in the control circuitry (i.e., in the data memory 110 as previously downloaded by an IT administrator) is accessed at 304. If the resident IT Policy permits simultaneous use of all wireless ports when also connected for wired communication via this particular wired port, as determined at 304, then the sub-routine will be exited at 306. However, if the IT Policy does not permit simultaneous use of all wireless ports when this particular wired port is connected for use, then all the non-permitted wireless ports (for that particular wired port connection) will be turned "off" at 308 before the sub-routine is exited at 306.

If the sensed change in wired port connectivity is a new disconnection state as determined at 310, then all now permitted wireless ports are turned "on" at 312 (i.e., again in accordance with the current resident IT Policy) before the sub-routine is exited at 306.

Figure 4:
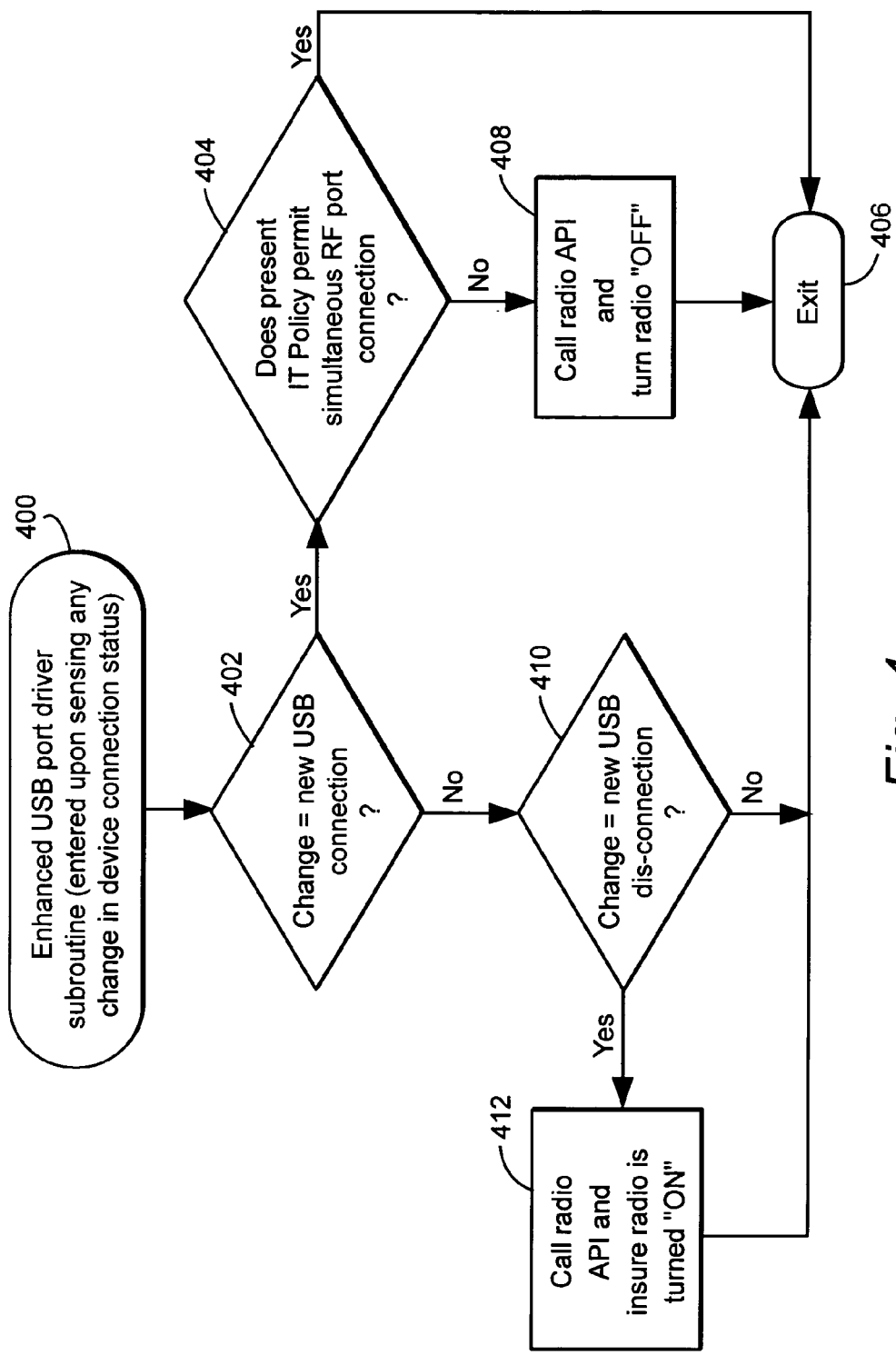
FIG. 4 is an exemplary abbreviated schematic flow chart of computer software (i.e., program logic) that may be utilized in the device of FIG. 2 for an enhanced USB port driver sub-routine.

In another exemplary embodiment as depicted in FIG. 4, the enhanced security sub-routine constitutes an enhanced USB port driver sub-routine entered at 400. Here if the change indicates a new connection has been established at 402, then the present IP Policy will be examined at 404 to see if simultaneous RF port connection is permitted for the newly connected USB port. If so, then the sub-routine will be exited at 406. If not, then the RF transceiver API is called at 408 and altered so as to disable or turn the RF transceiver "off". On the other hand, if the detected change corresponds to a new disconnection state of the USB port as determined at 410, then radio API is called at 412 and, in accordance with IT Policy, the API is altered so as to re-enable the radio or turn it "on" before exit of the sub-routine is taken at 406.

When a typical "wireless" communication device is also connected to a wired computer network via the user's desktop software, it is technically connected to two networks at the same time. The two networks are the normally used wireless network and the wired network associated with the user's computer it is (typically temporarily) now also connected to. Some security conscious organizations may be concerned about possible transmission of information between the wired computer network and the wireless network via the bridging communication device.

An IT Policy now may be defined which will allow an IT administrator to set the device into an enhanced security mode which will prevent this problem from occurring. The enhanced security mode solves the problem by turning off the radio transceiver when the device is wire-connected to the computer. Using the USB port driver, it can be determined when the device is being "enumerated" by the computer and as such the radio is then turned off. The radio is then automatically turned back on when the device wired port is disconnected from the computer. In brief summary, one physical channel is disabled when another physical channel is detected. Bluetooth, USB, irda are examples of such physical channels.

In one exemplary embodiment, the new enhanced security feature might be described as "disable radio when cradled." In another, it might be "disable Bluetooth when cradled." In yet another, it might be "disable both radio and Bluetooth when cradled." For example, it might be desired to leave Bluetooth enabled even when cradled so as to still permit use of a user ear piece. By making the enhanced security feature subject to an IT Policy for such details of possible combinations and permutations, an IT administrator is given great flexibility to tailor the enhanced security mode for optimum use in a given environment.

While the invention has been described in connection with presently preferred exemplary embodiments, those skilled in the art will recognize that various changes and modifications may be made to the exemplary embodiments while yet retaining many of the novel features and advantages of this invention. Accordingly, all such variations and modifications are intended to be included within the scope of the appended claims.

What is claimed is:

1. A mobile wireless communication device comprising:
   a plurality of communication ports including at least two wireless ports and at least one wired port;
   a computer-driven controller connected to control communication via the at least two wireless ports and the at least one wired port; and
   at least one security sub-routine incorporated into the controller, the security sub-routine including code that, when executed by the controller, causes the controller to disable, responsive to detecting that the at least one wired port has become connected for use, a selected wireless port among the at least two wireless ports, wherein enablement of the selected wireless port is not permitted, by a security policy resident within the controller, when the at least one wired port is connected for use.

2. The mobile wireless communication device of claim 1 wherein the security sub-routine causes the controller to effect the disabling by calling and utilizing an Application Programming Interface for the selected wireless port.

3. The mobile wireless communication device of claim 1 wherein the selected wireless port comprises an infra-red wireless transceiver circuit.

4. The mobile wireless communication device of claim 1 wherein the selected wireless port comprises a Radio Frequency (RF) transceiver circuit.

5. The mobile wireless communication device of claim 1 wherein the selected wireless port comprises a Bluetooth communication circuit.

6. The mobile wireless communication device of claim 1 wherein the at least one wired port comprises a serial digital data communication port.

7. The mobile wireless communication device of claim 6 wherein the at least one wired port comprises a Universal Serial Bus port.

8. The mobile wireless communication device of claim 1 wherein the at least one wired port comprises a parallel digital data communication port.

9. The mobile wireless communications device of claim 1 wherein the security sub-routine causes the controller to enable the selected wireless port responsive to detecting that the at least one wired port has become disconnected.

10. The mobile wireless communications device of claim 1 wherein the at least one wired port is a particular wired port and the security sub-routine further causes the controller to determine that the security policy does not permit simultaneous use of all of the at least two wireless ports when the particular wired port is connected for use.

11. The mobile wireless communications device of claim 1 wherein the security sub-routine further causes the controller to select the selected wireless port from among non-permitted wireless ports associated with the particular wired port.

12. A method of securing communication of a mobile wireless communication device having a plurality of communication ports including at least two wireless ports and at least one wired port, the method comprising:
   sensing a connection state of the at least one wired port, the connection state indicative of connection of the at least one wired port;
   accessing at least one security sub-routine at the device, the sub-routine representing a security policy; and
   according to the sub-routine, disabling a selected wireless port among the at least two wireless ports, wherein enablement of the selected wireless port is not permitted, by the security policy, when the at least one wired port is connected for use.

13. The method of claim 12 wherein the at least one wired communication port includes a Universal Serial Bus port incorporated into a cradle for holding the mobile wireless communication device while the mobile wireless communication device is wire-connected to a base unit.

14. The method of claim 12 further comprising enabling the at least one wireless port responsive to sensing a new wired disconnection.

15. The method of claim 12 wherein the at least one wired port is a particular wired port and the method further comprises determining that the security policy does not permit simultaneous use of all of the at least two wireless ports when the particular wired port is connected for use.

16. The method of claim 15 further comprising selecting the selected wireless port from among non-permitted wireless ports associated with the particular wired port.

17. A non-transitory digital storage medium containing a computer program security sub-routine adapted to control a mobile wireless communication device having enhanced security and being arranged for simultaneous wireless and wired connection, the mobile wireless communication device including a plurality of communication ports including at least one wireless port and at least one wired port, a controller connected to control communication via each of the plural ports, and the security sub-routine incorporated into the controller, the security sub-routine comprising code adapted to:
disable a selected wireless port among the at least two wireless ports, wherein enablement of the selected wireless port is not permitted, by a security policy resident within the controller, when the at least one wired port is connected for use.

18. The non-transitory digital storage medium of claim 17 wherein the security sub-routine is adapted to effect the disabling by calling and utilizing an Application Programming Interface for the selected wireless port.

19. The non-transitory digital storage medium of claim 17 wherein the at least one wired communication port includes a Universal Serial Bus port incorporated into a cradle for holding the mobile wireless communication device while the mobile wireless communication is wire-connected to a base unit.

20. The non-transitory digital storage medium of claim 17 wherein the security sub-routine is adapted to enable the at least one wireless communication port responsive to sensing a new wired disconnection.

21. The non-transitory digital storage medium of claim 17 wherein the at least one wired port is a particular wired port and the security sub-routine is adapted to determine that the security policy does not permit simultaneous use of all of the at least two wireless ports when the particular wired port is connected for use.

22. The non-transitory digital storage medium of claim 21 wherein the security sub-routine is adapted to select the selected wireless port from among non-permitted wireless ports associated with the particular wired port.

23. A mobile wireless communication device comprising:
a plurality of communication ports including at least two wireless ports and at least one wired port; and
at least one security sub-routine, the security sub-routine including code that, when executed, causes disabling, responsive to detecting that the at least one wired port has become connected for use, of a selected wireless port among the at least two wireless ports, wherein enablement of the selected wireless port is not permitted, by a security policy, when the at least one wired port is connected for use.

* * * * *